UNITED STATES PATENT OFFICE 2,547,365

PHENOXYETHYL QUATERNARY AMMONIUM SALTS

Louis H. Bock, Huntingdon Valley, and Leo S. Luskin, Philadelphia, Pa., assignors to Rohm & Haas Company, Philadelphia, Pa., a corporation of Delaware No Drawing. Application January 28, 1949, Serial No. 73,438

4 Claims. (Cl. 260—567.6)

This invention relates to phenoxyethyl quaternary ammonium salts of the formula

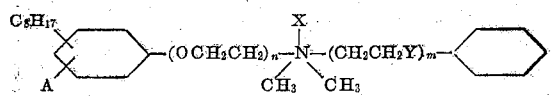

wherein the $C_8H_{17}$— is a non-primary alkyl group; i. e., secondary or tertiary, A is hydrogen or the methyl group, Y is a chalcogen of atomic weight 16 to 32, X is chlorine or bromine, $n$ is an integer from one to three, and $m$ is an integer from one to two.

The compounds falling within this structure form a small but unique group of quaternary ammonium salts which are characterized by high bactericidal efficiency and good fungicidal action coupled with relatively low toxicity toward warm-blooded animals and little, if any, irritation to mucous membranes and other exposed surfaces. They are useful for destroying growth of bacteria and fungi generally, but are particularly desirable for pre-operative cleansing of skin, surface treatment of wounds, sterilization of surgical instruments, and the like. They are effective antiseptics and disinfectants at low concentrations. This is particularly true of their action against Gram-positive pathogenic bacteria. They are effective for destroying odors, particularly those arising from putrefaction, and because of their lack of irritation are particularly suitable for spraying in solution for such purposes. The dilute solutions of these compounds are relatively free of objectionable taste.

The compounds of this invention are prepared by reacting together in approximately equivalent weights a compound of the formula

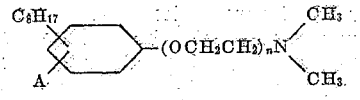

and a compound of the formula

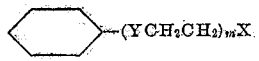

at a temperature between 50° C. and 100° C. in the presence of sufficient organic solvent to maintain the fluidity of the reaction mixture.

Typical of the tertiary N,N-dimethylamines of the above formula which may be used are those having such N-substituents as o-caprylphenoxyethyl, p-1,1,3,3-tetramethylbutylphenoxyethyl, p-1,1,3,3-tetramethylbutylphenoxyethoxyethyl, p-1,1,3,3-tetramethylbutylphenoxyethoxyethoxyethyl, p-1,5,5-trimethylpentylphenoxyethyl, p-diisobutyl-o-cresoxyethyl, and the like.

The phenyl ether halides are represented by phenoxyethyl chloride or bromide and phenoxyethoxyethyl chloride or bromide, phenylthioethyl chloride or bromide, phenoxyethylthioethyl halide, and phenylthioethylthioethyl halide.

The solvents which are useful include hydrocarbons such as toluene and xylene, esters such as butyl acetate, nitrohydrocarbons, such as nitromethane, and miscellaneous solvents such as acetonitrile and formamide. Mixtures of solvents are often particularly useful. It is desirable to use sufficient solvent to maintain the reaction mixture in a fluid state. After the reaction has been carried toward completion, the solvent may be removed, replaced, or supplemented with other solvents which are suitable for promoting crystallization, such as ethyl acetate, ethyl alcohol, ethyl ether, isopropyl ether, or mixtures of such solvents.

The reaction is carried out in one or more volatile organic solvents at 50° to 100° C. and the product is obtained either as a residue after evaporation of solvent or as a crystalline solid, particularly after adjustment of solvent as to type and/or amount.

Illustrative examples for the preparation of the compounds of this invention follow.

Example 1

There were mixed 68 parts by weight of p-1,1,3,3-tetramethylbutylphenoxyethoxyethyl dimethylamine, 33 parts of beta-phenoxyethyl chloride, and 30 parts of nitromethane. The mixture was stirred and heated at 80° to 85° C. for 88 hours. At this time a titration for ionizable chlorine indicated a conversion of 83.5%. The nitromethane was distilled off under reduced pressure, leaving a gummy mass. This was triturated with ethyl acetate to give a crystalline solid in a yield of 33 parts. Analyses showed the product to correspond to $C_{28}H_{44}ClNO_3$ or

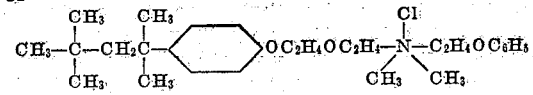

This compound was found to have a phenol coefficient of 350 against *Salmonella typhi* and of 730 against *Staphylococcus aureus*. Its effective dilution in trypticase-soy broth was 1 to 1,000,000 against *Staphylococcus aureus* and *Streptococcus fecalis*.

Example 2

A mixture was made from 340 parts of 2-methyl - 4 — (1,1,3,3-tetramethylbutyl) phenoxyethoxyethyl dimethylamine, 202 parts of beta-phenoxyethyl bromide, 200 parts of nitromethane, and 250 parts of acetonitrile. The mixture was heated at 80° C. to 90° C. for four hours. Ethyl acetate was added to the mixture as it cooled. Crystals formed and were separated. Solvent was removed therefrom by vacuum evaporation. The crystals resulting contained 14.58% of bromine compared to the theoretical value of 14.91% for $C_{29}H_{46}BrNO_3$. The product was 2-methyl-4-(1,1,3,3-tetramethylbutyl)phenoxyethoxyethyl phenoxyethyl dimethyl ammonium bromide.

It has a phenol coefficient of about 185 against *Salmonella typhi* by the F. D. A. method and of about 355 against *Staphylococcus aureus*.

*Example 3*

A mixture was prepared from 680 parts of p-1,1,3,3 - tetramethylbutylphenoxyethoxyethyl dimethylamine, 404 parts of beta-phenoxyethyl bromide, and 1084 parts of acetonitrile. The mixture was stirred and heated on a hot water bath at about 85° C. for five hours. The reaction mixture was diluted with 1800 parts of ethyl acetate and cooled. Crystals formed, were removed by filtration, and were dried. Solvent was taken from the filtrate under reduced pressure and a second crop of crystals was obtained. The total yield was 812 parts of colorless crystals which corresponded in composition to

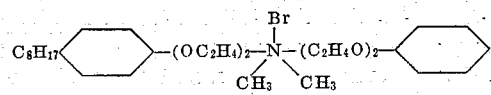

The phenol coefficient of this compound was determined as 310 with *Salmonella typhi* and 785 with *Staphylococcus aureus*.

Effective dilutions were determined in trypticase-soy broth for bactericidal (Bc) and bacteriostatic (Bs) effects as follows: for *Staph. aureus*, Bc 1 to 128,000; Bs 1 to 8,192,000; for *S. pyogenes*, Bc 1 to 2,048,000, Bs 1 to 8,192,000; for *S. fecalis*, Bs 1 to 256,000, Bs 1 to 1,024,000; *N. catarrhalis*, Bc 1 to 1,024,000, Bs 1 to 2,048,000; and for *Cl. welchii*, Bc 1 to 512,000, Bs 1 to 512,000.

Fungitoxicity tests were made by the slide germination technique with *Macrosporium sarcinaeforme* (Cav.) as the test organism. At a dilution of 1 to 200,000 of the above compound there was 100% inhibition of germination.

Toxicity toward warm-blooded animals was determined by oral administration of a 20% aqueous solution to rats. The milligrams of the compound per kilogram of body weight which killed half of the test animals was 750.

Dilute solutions have been found non-irritating to nose, throat, and eye.

*Example 4*

There were mixed 335 parts by weight of o-caprylphenoxyethyldimethylamine, 260 parts of phenoxyethyl bromide, and 63 parts of ethyl acetate. The mixture was stirred and heated under reflux for two hours. There was added 830 parts of ethyl acetate and the mixture cooled. There was obtained a crystalline product in an amount of 445 parts.

For the preparation of the above amine there were mixed 139 parts of o-caprylphenoxyethyl chloride, 310 parts of a 25% aqueous dimethylamine solution, and 24 parts of sodium hydroxide in a concentrated aqueous solution. The mixture was heated in an autoclave for five hours at 140°–155° C. at a pressure of 70–100 lbs. The mixture was cooled, separated, and distilled. The desired chloride was obtained at 160° C. to 180° C./4 mm.

The product resulting from the reaction of the caprylphenoxyethyldimethylamine and phenoxyethyl bromide was found to correspond by anaylsis to

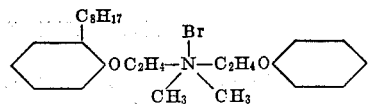

It had a phenol coefficient of about 350 against *Salmonella typhi* and of about 750 against *Staphylococcus aureus*.

*Example 5*

There were mixed 101 parts of diisobutylphenoxyethoxyethyl dimethylamine, 74 parts of phenoxyethoxyethyl bromide, and 175 parts of acetonitrile. The mixture was stirred and heated for 6.25 hours under reflux. The mixture was then chilled. Crystals formed and were filtered off. The yield was 121 parts of a compound having the formula

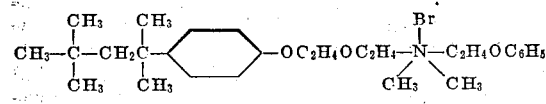

This product had a phenol coefficient of 400 against *Salmonella typhi* and 600 against *Staphylococcus aureus*.

*Example 6*

There were mixed 84 parts of diisobutylphenoxyethyl dimethylamine, 74 parts of phenoxyethoxyethyl bromide, and 158 parts of acetonitrile. The mixture was stirred and heated at 80°–85° C. for 6.5 hours. The solvent was stripped off under reduced pressure. The residue was taken up in hot ethyl acetate, cooled, and crystallized. The yield was 95 parts of diisobutylphenoxyethyl dimethyl phenoxyethoxyethyl ammonium bromide.

It has a phenol coefficient of 425 against *Salmonella typhi* and of 625 against *Staphylococcus aureus*.

*Example 7*

There were mixed 150 parts of o-caprylphenoxyethoxyethyl dimethylamine, 106 parts of phenoxyethyl bromide, and 256 parts of acetonitrile. The mixture was stirred and heated under reflux for 5.75 hours. The solvent was stripped off at low pressure and the residue was taken up in ethyl acetate. Crystals were formed on cooling and were separated. The yield was 180 parts of o-caprylphenoxyethoxyethyl phenoxyethyl dimethyl ammonium bromide.

The product had a phenol coefficient of about 400 against *Salmonella typhi* and 600 against *Staphylococcus aureus*.

*Example 8*

There were mixed 39 parts by weight of p-1,1,3,3 - tetramethylbutylphenoxyethoxyethyl dimethylamine, 21 parts of phenoxyethyl bromide, and 60 parts of acetonitrile. The mixture was stirred and heated for four and a half hours under reflux. The solvent was evaporated under reduced pressure to give a residue which was taken up in ethyl acetate and crystallized therefrom. The yield was 25 parts of a product having the composition

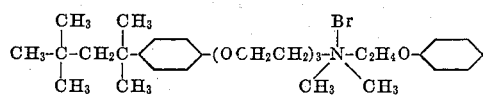

The phenol coefficients for this compound were 225 against *Salmonella typhi* and 330 against *Staphylococcus aureus*.

*Example 9*

There were mixed 169 parts of p-1,1,3,3-tetramethylbutylphenoxyethoxyethyl dimethylamine and 95 parts of phenylthioethyl chloride and 20 parts of nitromethane was added thereto. The mixture was heated on a steam bath for 78 hours and stripped of solvent. The residue was taken up in ethyl acetate and crystallized therefrom. The yield was 90 parts of tetramethylbutylphenoxyethoxyethyl phenylthioethyl dimethyl ammonium chloride.

It was found to have a phenol coefficient of 275 against *Salmonella typhi* and 570 against *Staphylococcus aureus*.

The phenylthioethyl chloride used above was prepared by the reaction of 55 parts of thiophenol and 42 parts of ethylene chlorohydrin in 150 parts of methanol in which 11.5 parts of sodium had been dissolved. This formed sodium chloride, which was filtered off, and phenylthioethyl alcohol, which was distilled at 125° C.–131° C./6 mm. This was converted to the chloride by passing hydrogen chloride into it on the steam bath for four hours. The desired product was distilled at 110° C.–119° C./9 mm.

*Example 10*

There were mixed 111 parts of phenylthioethyl bromide, 169 parts of 1,1,3,3-tetramethylbutylphenoxyethoxyethyl dimethylamine, and 49 parts of ethyl acetate. The mixture was refluxed for about four hours. Crystals formed when the reaction mixture was cooled. These were separated, washed, and air-dried. They corresponded in composition to

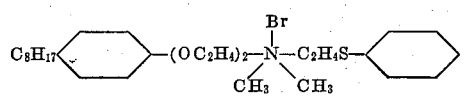

Evaluation of this compound against *Salmonella typhi* and *Staphylococcus aureus* gave phenol coefficients of 435 and 570 respectively.

In testing the compounds of this invention bactericidal efficiency was measured in a number of ways and against various organisms. Phenol coefficients were determined by the F. D. A. method at 20° C. and represent the ratio of effective dilution of the compound under test to the effective dilution of phenol.

Tests were also run against pathogenic organisms by a dilution method utilizing trypticase-soy broth. One per cent solutions of the product under test were diluted with broth and several dilutions autoclaved for ten minutes at 10 to 12 lbs. pressure. The dilutions were cooled and inoculated with a 4 mm. loopful of a test organism culture. Incubation was carried out at 37° C. for 24 hours. The highest dilution showing no growth gave the end-point for bacteriostatic action. After an additional 24 hours of incubation at 37° C. subcultures were made by transferring three loopfuls from cultures showing no growth to fresh trypticase-soy broth. The subcultures were incubated 48 hours. The highest dilution showing no growth was taken as the end-point of bactericidal action.

Fungitoxicity tests were made by the slide germination technique with *Macrosporium sarcinaeforme* and *Sclerotinia fructicola* as the test organisms. A 100% inhibition of germination of spores was obtained at 1 to 200,000 dilution with tetramethylbutylphenoxyethoxyethyl phenoxyethyl dimethyl ammonium bromide. Results with other compounds of this type are all of the same order. A spray containing one pound of tetramethylbutylphenoxyethoxyethyl phenoxyethyl dimethyl ammonium bromide dispersed in 100 gallons of water was applied to celery. Only 18% of the thus-treated plants showed signs of Sercospora blight while 95% of the control plants were diseased.

The data which have been obtained coupled with favorable properties which have been described above establish the compounds of this invention as valuable and useful. Of particular interest are those compounds in which A of the general formula is hydrogen, since these have a highly favorable combination of properties. The bromides seem to be particularly mild and non-irritating and yet are quite as potent against bacteria and fungi as the chlorides on a weight basis.

We claim:

1. As a new chemical substance, a compound of the formula

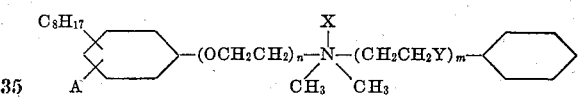

wherein C₈H₁₇— is a non-primary alkyl group, A is a member of the class consisting of hydrogen and the methyl group, X is a halogen, Y is a chalcogen of an atomic weight not over 32, n is an integer from one to three, and m is an integer from one to two.

2. A compound of the formula

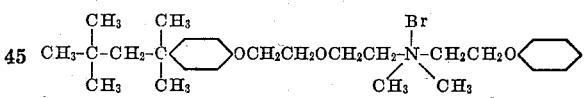

3. A compound of the formula

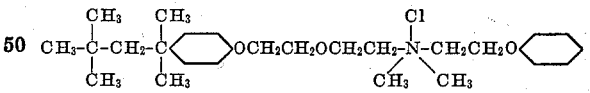

4. A compound of the formula

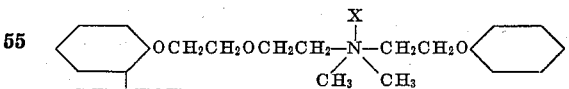

where X is a halogen.

LOUIS H. BOCK.
LEO S. LUSKIN.

REFERENCES CITED

The following references are of record in the file of this patent:

UNITED STATES PATENTS

| Number | Name | Date |
| --- | --- | --- |
| 2,115,250 | Bruson | Apr. 26, 1938 |

OTHER REFERENCES

J. Am. Pharmaceutical Assn., Proc. Pharm. Edit., Dec. 1946, p. 560.